United States Patent Office 3,639,652
Patented Feb. 1, 1972

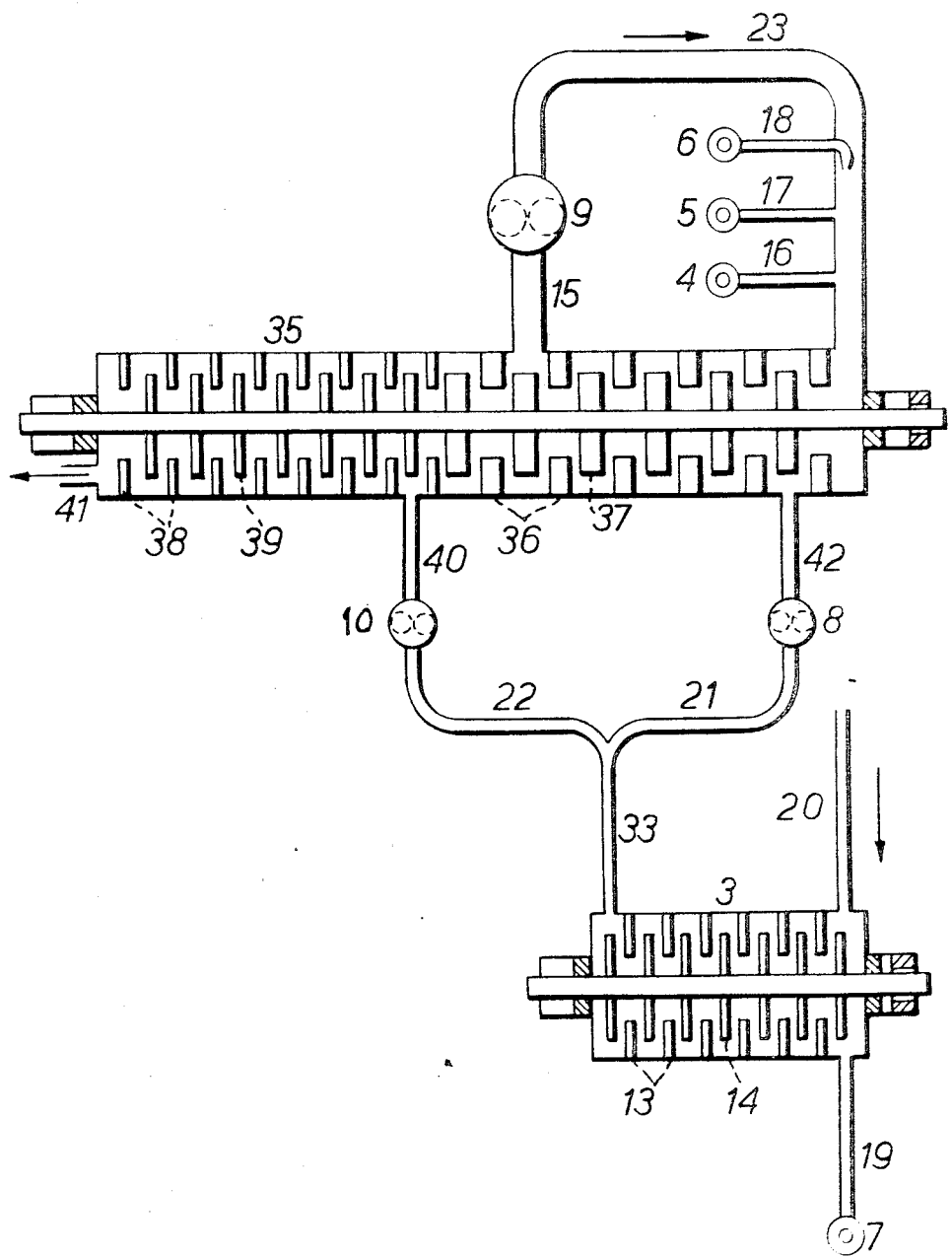

3,639,652
CONTINUOUS PROCESS FOR POLYMERIZING URETHANE PREPOLYMERS
Henri Albert Mommaerts, 17 Rue Paul Emile Janson, Brussels, Belgium, and Wilfred Jean Melaerts, Kruiskensveld 2, Halle Essen Beek, Belgium
Filed Mar. 13, 1969, Ser. No. 807,050
Claims priority, application Great Britain, Mar. 18, 1968, 12,934/68
Int. Cl. C08g 22/04
U.S. Cl. 260—30.8 DS                    15 Claims

ABSTRACT OF THE DISCLOSURE

This invention is a continuous process for the production of solutions of substantially linear polyurethanes useful to produce filaments and other articles. In the process there is passed into a first reaction zone an organic solvent, a substantially linear isocyanate-terminated prepolymer and at least one chain extension agent having at least two hydrogen atoms to produce a solution of a semi-polymer. The prepolymer is present in the first reaction zone in an amount less than the stoichiometrical amount, so that there is obtained in the first reaction zone a degree of reaction in excess of about 80%, but less than 100%. The semi-polymer is then passed continuously into a second reaction zone where there is added an amount of prepolymer sufficient to complete the polymerization of the semi-polymer.

The process also involves the recycle to the first reaction zone of a portion of the semi-polymer solution produced therein.

---

This invention relates to a continuous process for polymerizing urethane prepolymers and the continous process for obtaining solutions of substantially linear polyurethanes.

Substantially linear polyurethane solutions have numerous industrial applications in the fields of fibres, filaments, films, other shaped articles, adhesives and coatings. However, such solutions are ordinarily useful only if they are homogeneous and free from undissolved or incompletely dissolved particles such as gels.

The preparation of homogeneous solutions free of heterogeneity is obtained in general by the discontinuous method of polymerization of urethane prepolymers, which permits controlling the reactions and thus preventing the undue formation of gel-forming particles. But any discontinuous method involves major disadvantages in any manufacturing technique. In fact, the discontinuity in the polymerization operations of urethane prepolymers increases the number of manipulations, makes very difficult the reproducibility of operations, and is detrimental to the quality of the urethane polymer solutions which result from it.

The production of homogeneous and reproducible solutions of urethane polymers over a period of time is particularly desirable if such solutions have to be extruded either in the form of filaments or fibres or in the form of films.

The continuous processes for polymerization of urethane prepolymers and for the preparation of urethane polymer solutions which are usually employed do not permit efficient control of the critical factors interfering with the reactants. Among these factors are the dispersion of the prepolymer, which must be sufficient to avoid local overconcentrations, the speed of reaction required to prevent the formation of gel-forming particles, and the magnitude of the molecular weight.

The usual techniques for continuous polymerization of urethane prepolymer and for the preparation of polyurethane solutions do not permit control of the various factors critical in the chain extension reaction, and, consequently, result in heterogeneous solutions which are not free of gels.

In accordance with this invention, a continuous process is provided of polymerization of urethane prepolymers by elongation of the chains with a chain extension agent possessing at least two active hydrogen atoms, during which the formation of gels is excluded by control of the dispersion, the viscosity, the solids content and the rate of reaction.

The practice of the process of this invention produces substantially linear polyurethane solutions, free from formation of gels, suitable for the making of shaped articles and, more particularly, of filaments, fibres, films, coatings and adhesives.

In accordance with this invention, there are passed continuously through a first reaction zone a substantially linear urethane prepolymer having terminal or end isocyanate groups in an amount less than that which is stoichiometrically necessary and at least one chain extension agent having at least two active hydrogen atoms. In addition, there may be introduced simultaneously into the first reaction zone a chain terminating agent, an organic solvent and/or a certain amount of the dissolved semi-polymer obtained in this first phase and recycled.

The resulting semi-polymer solution produced in the first reaction zone is passed continuously through a second reaction zone with sufficient prepolymer to complete the polymerization reaction.

A great variety of prepolymers may be used according to this invention. The preferred compounds, containing active hydrogen atoms and utilizable for the preparation of prepolymers, include polyalkylene ether glycols, polyester glycols, polyamide glycols, polyacetal glycols, and/or their combinations.

The macroglycols which are best suited for carrying out the invention have an average molecular weight of between 500 and 5,000, preferably between 1,000 and 3,000. To obtain the best results, the glycols or mixtures of them used have melting points below 60° C.

Examples of polyalkylene ether glycols which are utilizable according to the invention are polypropylene ether glycol, polytetramethylene ether glycol, polypropyleneethylene ether glycol, polyhexamethylene ether glycol, and polymonomethylene ether glycol. Polyethylene ether glycol is often used mixed with other polyether or polyester glycols; it is rarely used alone because of its relatively high solubility in water.

The polyester glycols which are utilizable according to the invention are generally prepared by reacting appropriate quantities of glycols of low molecular weight with dicarboxylic acids, diacid chlorides or diesters thereof. Examples of glycols employed in the process of the invention are ethylene glycol, propylene glycol, tetramethylene glycol, neopentyl glycol, xylylene glycol, and hexanediol. Examples of dicarboxylic acids used to form the polyester glycols are succinic, adipic, suberic, sebacic, pimelic, glutaric, azelaic and terephthalic acids. Cycloaliphatic acids such as 1,4-cyclohexanedicarboxylic acid can also be used.

Polyesters derived from lactones such as caprolactone, methyl caprolactone and butyrolactone can also be used.

Mixed polyester glycols formed by using mixtures of glycols and/or dicarboxylic acids of low molecular weight can also be used.

Polyacetal glycols can also be used and are prepared by the reaction of a polyhydric alcohol, such as butane- 1,4-diol, hexane-1,6-diol, 1,4-butane-beta-dihydroxy ether or ethylene glycol, with an aldehyde, such as formaldehyde, paraformaldehyde, acetaldehyde, crotonaldehyde or chloral.

It is also possible to use polyamide glycols. These are obtained from diols, polyalcohols, diamines or aminoalcohols by condensation with polycarboxylic acids, hydroxy acids or amino acids. These polyamide glycols can be prepared, for example, from the reaction of succinic, adipic or sebacic acid with ethylene-diamine or hexamethylene-diamine and a diol, such as ethylene glycol.

The diisocyanate or diisocyanates used for the preparation of the prepolymer may be symmetrical or asymmetrical aromatic, aliphatic or cycloaliphatic compounds. These disiocyanates may, for example, contain no substituent in the alpha position to the isocyanate groups or can contain at least one substituent in the alpha position to at least one of the isocyanate groups.

Examples of the diisocyanates containing no substituent in the alpha position to the isocyanate groups include p-phenyl diisocyanate, o-, m- and p-xylylene diisocyanate, diphenylene-4,4'-diisocyanate, diphenylmethane-4,4'-diisocyanate, naphthylene-1,5-diisocyanate, cyclohexylene-1,4-diisocyanate and hexamethylene-1,6-diisocyanate.

Examples of diisocyanates having at least one substituent in the alpha position to at least one of the isocyanate groups are tolylene-2,4-diisocyanate, tolylene-2,6-diisocyanate, mesitylene diisocyanate, durene diisocyanate, 3,3-dimethyl - diphenylmethane - 4,4' - diisocyanate, 3,3'-dimethyl-diphenylene-4,4'-diisocyanate, diphenyl methane-2,4'-diisocyanate, 4-chlorophenylene-1,3-diisocyanate and 2-ethyl-propane-1,3-diisocyanate.

Mixtures of these various diisocyanates in any molecular proportion may be used, diphenylmethane-4,4'-diisocyanate being preferably used.

The prepolymers used according to the present invention are preferably diluted with an organic solvent, such as dimethyl formamide, dimethylacetamide, dimethyl sulphoxide or other solvents for substantially linear polyurethanes.

Dilution of the prepolymer with a solvent is also a factor which contributes towards its good dispersion in the two reaction zones. It affects the viscosity of the solution and, consequently, the speed of subsequent dispersion in the polymerization medium. Although great dilution is beneficial in principle, nevertheless it entails a not insignificant loss of free isocyanate groups. It is, therefore, advisable not to dilute too much. Prepolymers diluted with 20%, 30% or 40% of solvent may be used in practice.

The solvent, which is preferably organic, used for the dilution of the prepolymer may be the same as that introduced into the first reaction zone at the same time as the chain extension agent.

The chain extension agent may be previously dissolved in the organic solvent or, if desired, may be injected into a stream of the organic solvent at the time it is introduced into the first reaction zone or, alternatively, at the same time as the recycled urethane semi-polymer. By semi-polymer, there is to be understood the polymer obtained after passing through and partially recycling to the first reactor.

The chain extension agent may be, for example, a diamine, glycol, amino alcohol or any other agent containing at least two active hydrogen atoms.

Examples of amines which may be used are ethylene-diamine, propylene-diamine, tetramethylene-diamine, the xylylene-diamines, the p-phenyl-diamine and hydrazine, but ethylene-diamine is preferably used.

Examples of glycols are ethylene glycol, hexamethylene glycol, diethylene glycol and butanediol.

The amino alcohol used is preferably monoethanolamine.

In the chain extension reaction in the first reaction zone, it is sometimes desirable to use two or more chain extension agents, selected from the diamines, glycols, or other chain extending agents.

The use of a plurality of diamines offers the advantage that it is possible to influence various physical or chemical characteristics of the urethane polymer resulting therefrom.

Thus, the use of N-methyl-bis-(3-aminopropyl) amine, N,N'-piperazine-bis-(propionic acid) dihydrazide, 1,4-bis-(3-aminopropyl)-piperazine or reaction products of a dialkylene-triamine with an aldehyde (described in U.S. patent application Ser. No. 709,961, filed March 4, 1968 and now U.S. Pat. No. 3,554,974), mixed with other chain extending agents, makes it possible to improve the dyestuff affinity of the substantially linear urethane polymer resulting therefrom. This effect is particularly desired in the manufacture of filaments and fibres.

The degree of reaction of the chain extension agent with the isocyanate groups of the urethane prepolymer is also one of the factors influencing the dispersion of the prepolymer. Although it is advantageous to use the largest possible quantity of urethane prepolymer in the first stage, this quantity, which must be lower than that which is stoichiometrically necessary, is limited by the increase in viscosity of the reaction medium. This limit depends on the degree of reaction in the first reaction stage, the amount of chain terminating agent permitted and the recycled flow of urethane semi-polymer.

A more comprehensive understanding of this invention is obtained by reference to the drawings in which:

FIG. 7 shows a single reactor for practising the process of the invention.

Figure 1:
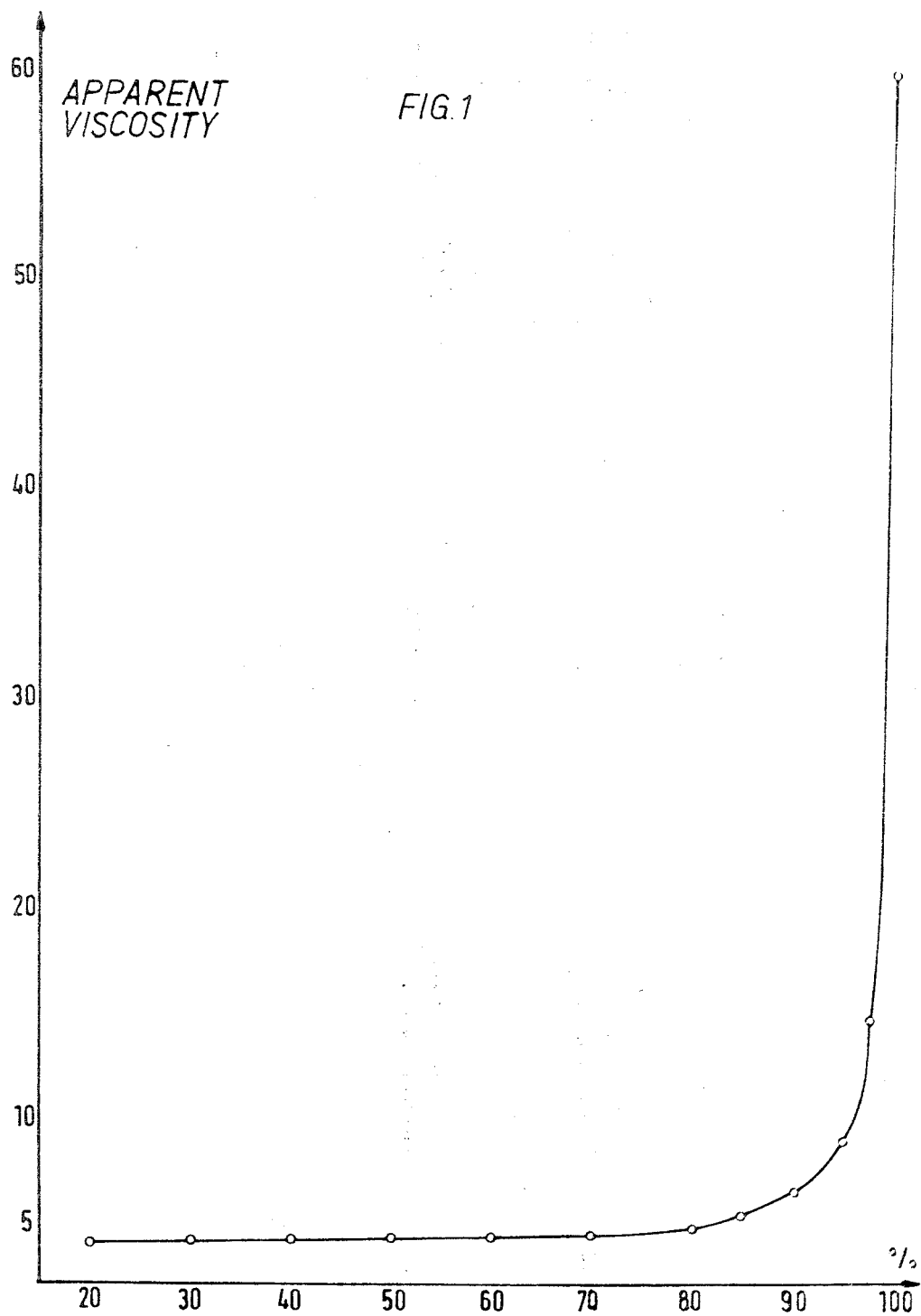
FIG. 1 shows the increase of apparent viscosity during polymerization in the process of this invention as a function of the completeness of reaction in the first step of that process.

In FIG. 1, there is shown the evolution of apparent viscosity in the course of the polymerization, plotted against the reaction of the isocyanate groups free from polymer with a chain extension agent of the diamine type, in this case ethylene diamine. It is found that above an 80% degree of reaction the viscosity commences to increase rapidly.

The degree of reaction of the chain extending agent in the course of the first phase of the reaction is so selected as to avoid an excessively high viscosity of the reaction medium. A viscosity not exceeding 40 poises, and preferably 30 poises, makes it possible to achieve a relatively high degree of reaction, generally higher than 80% of the isocyanate groups of the urethane prepolymer, but lower than 100%.

If a given degree of reaction is adopted, the apparent viscosity of the reaction medium will depend on the amounts and the nature of the reagents used, as well as on the rate of recycling flow of urethane semi-polymer obtained in this first reaction phase. A degree of reaction of about 85% may generally be obtained without difficulty and, in this case, the apparent viscosity is then lower than 25 poises and generally of the order of 10 poises. These conditions reduce the heating of the reaction medium to the minimum.

In the first polymerization phase, it is advisable to use a chain terminating agent, which has the effect of limiting the molecular weight of the chains being formed and which, consequently, controls the viscosity of the reaction medium in the two polymerization stages.

The chain terminating agents are characterized by the presence of a single primary or secondary amino group in their molecules. Dimethylamine, diethylamine, diethanolamine and N,N-dimethyl-propane-1,3-diamine are examples.

The amount of chain terminating agent used should not exceed 8 to 10 mol percent, referred to all the amino groups present with less than 3 mol percent of the chain terminating agent generally being used.

The solvent injected at the same time as the chain extending agent is generally of the same type as that used for diluting the prepolymer. Dimethyl formamide, dimethyl acetamide or dimethyl sulphoxide are preferably used but other solvents can also be employed.

The total quantity of solvent to be introduced into the polymerization system must be such that the solids content of the polymer solution is between 10 and 25% by weight, preferably between 15 and 20% by weight. These limits are entailed by spinning and extrusion requirements.

The recycling of a certain amount of the dissolved urethane semi-polymer obtained in the first reaction phase, which entailed the dilution of the reaction medium, controls the speed of the reaction.

Although the factors promoting rapid and effective dispersion of the prepolymer contribute toward obtaining a regular, homogeneous polymer free from gels, their effects may be completely cancelled if the speed of reaction is too high.

The reduction of the speed of reaction or, in other words, the increase of the recycled flow of the semi-polymer, will be increasingly necessary as the speed of reaction between the prepolymer having isocyanate terminal groups and the chain extension agent having at least two reactive hydrogen atoms increases.

The degree of recycling to be selected will, consequently, depend on the degree of reactivity of the reagents used.

If, for example, a diamine having the ability to react rapidly with the isocyanate groups, for example, ethylenediamine, is selected as chain extending agent, it will be desirable to recycle the semi-polymer. By this means, there is effected a dilution of the reaction medium which has the effect of substantially reducing the speed of reaction. Thus, in the case of a recycling flow about 10 times as great as the total feed flow of reagents, the residence time of the polymer being formed is one-tenth as long and, on the average, the semi-polymer will pass through the reactor 10 times before being discharged therefrom.

The continuous process for the polymerization of a urethane prepolymer having isocyanate terminal groups and for the production of a solution of a substantially linear polyurethane resulting therefrom is characterized by the continuous passage into:

(a) a first reaction zone of:
(1) a urethane prepolymer in an amount such that the degree of reaction of the chain extension agent with the isocyanate groups of the prepolymer is higher than 80% and preferably higher than 85% but lower than 100%, this prepolymer being diluted with an organic solvent;
(2) a chain extension agent having at least two reactive hydrogen atoms;
(3) a chain terminating agent;
(4) an organic solvent, in such an amount as to give a total concentration of solid materials of at least 10%;
(5) a part of the semi-polymer solution obtained in this first phase, in an amount such that the speed of reaction is substantially reduced; and (b) into a second reaction zone of:
(1) the remainder of the semi-polymer solution formed in the first reaction phase which is no longer recycled, and
(2) the complement of dissolved prepolymer necessary to complete the polymerization reaction.

The process of continuous polymerization of substantially linear urethane prepolymers may be combined with a continuous process for the preparation of said prepolymer. In this case, the process is continuous from the raw materials up to the production of substantially linear urethane polymer solutions capable of being used directly for the production of filaments, fibres, films, or other shaped articles as well as of coatings and adhesives. The continuous process for the preparation of a urethane prepolymer may comprise the continuous introduction into a reaction zone of a compound containing at least two hydroxyl groups, such as a glycol, and an organic diisocyanate at a temperature such that, after a fixed residence time, there is formed a substantially linear urethane prepolymer having isocyanate end groups.

The prepolymerization reactor may be of any conventional type having input nozzles for the reagents, devices for agitating, mixing and transport and also an outlet nozzle; the outlet nozzle may be directly connected to the prepolymer inlet pipe for the process according to the present invention.

The apparatus for the continuous polymerization of urethane prepolymers comprises either two separate reactors for the two reaction phases or a single reactor in which the two reaction phases follow one another. According to one embodiment of the present invention, it comprises a first reactor into which there are introduced:

(a) a substantially linear urethane prepolymer having isocyanate end groups, optionally dissolved in a certain amount of solvent;
(b) a chain extension agent having at least two active hydrogen atoms;
(c) optionally a chain terminating agent;
(d) an organic solvent; and
(e) a part of the dissolved semi-polymer obtained in this reactor;

and a second reactor into which there are introduced:

(a) the remainder of the dissolved semi-polymer formed in the first reactor; and
(b) the complement of prepolymer necessary to complete the polymerization reaction.

According to another embodiment of the present invention, the two reactors can be combined, utilizing the cycle provided for the introduction of the various reagents.

The continuous polymerization apparatus will be better understood by reference to FIGS. 2, 3, 4, 5, 6 and 7 of the accompanying drawings.

Figure 2:
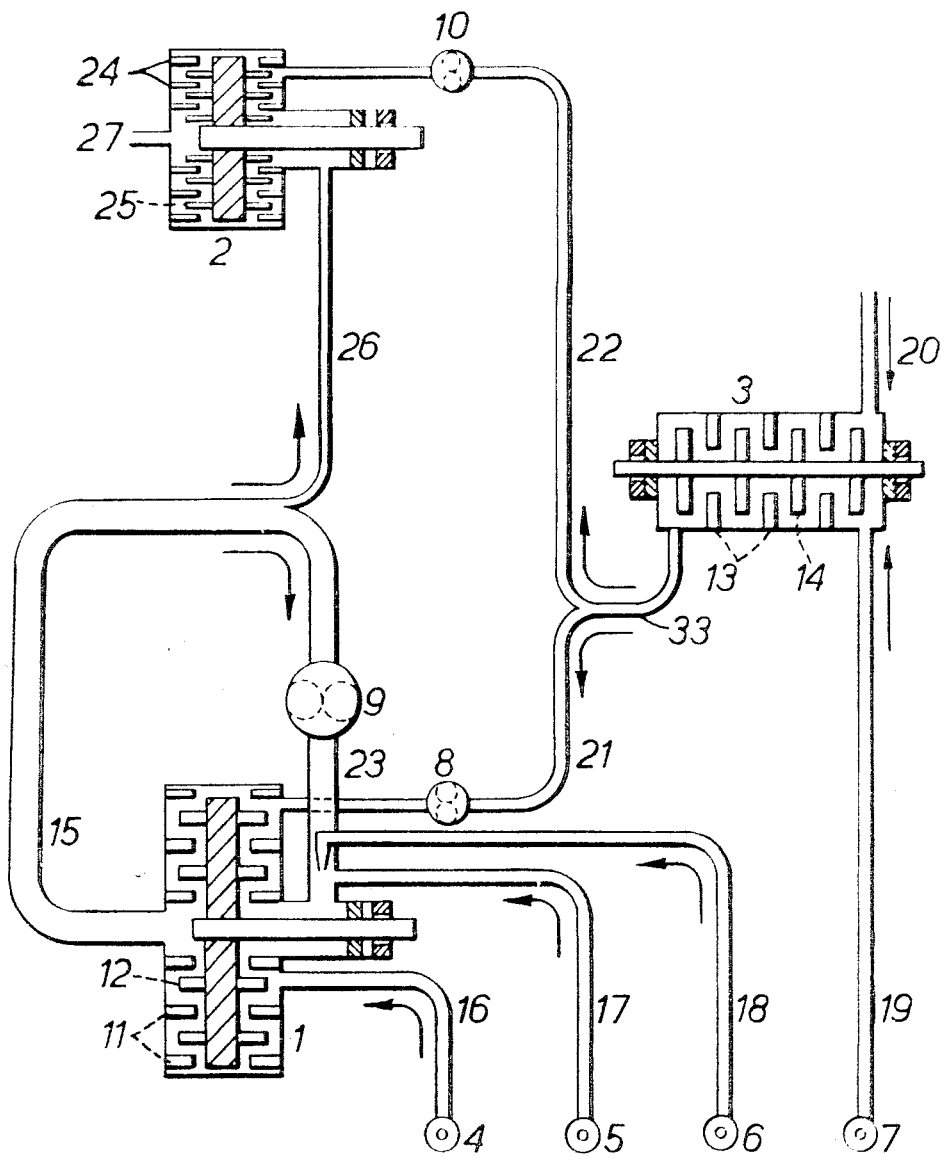
FIG. 2 represents apparatus which may be employed for the practice of the process of this invention.

Referring to FIG. 2, a reactor 1 of the conventional mixer type, provided with agitating devices 11 and 12, is supplied with the aid of pumps 8, 4, 5, 6 and 9, with dilute prepolymer solution, chain terminating agent, organic solvent, chain extension agent and urethane semi-polymer coming from the reactor through the pipe 15.

Pump 8 feeds reactor 1 with dilute prepolymer coming from a mixer 3, which is supplied at 20 with undiluted prepolymer and at 19 with solvent supplied by a pump 7. The mixer 3 is of conventional type provided with agitation devices 13 and 14.

The dilute prepolymer, coming from mixer 3 passes into pipes 33 and 21 and is delivered by the pump 8 to the reactor 1. The chain terminating agent coming from a reservoir (not illustrated) is delivered by a pump 4 into a pipe 16 leading to the reactor 1.

The organic solvent coming from a reservoir (not illustrated) is delivered by a pump 5 to a pipe 17 leading into a recycling pipe 23 and from the latter to the reactor 1.

The chain extension agent, likewise coming from a reservoir (not illustrated), is introduced by a pump 6 through a pipe 18 and injected into the urethane semi-polymer recycling pipe 23.

The semi-polymer passing out of the reactor 1 through the pipe 15 and not recycled to the reactor through the pump 9 and pipe 23, is supplied through a pipe 26 to reactor 2, which is of the conventional mixer type provided with agitation devices 24 and 25.

The reactor 2 is supplied with dilute prepolymer by pump 10 and pipes 33 and 22 supply the dilute prepolymer from the mixer 3 referred to previously.

The dissolved urethane polymer is discharged from the reactor 2 through pipe 27.

The system for supplying dilute prepolymer to reactor 2, which in FIG. 2 is effected through pipe 22 and pump 10, may be of any type; for example, the prepolymer could be introduced through two separate pipes connected to the pipe 33.

Figure 6:
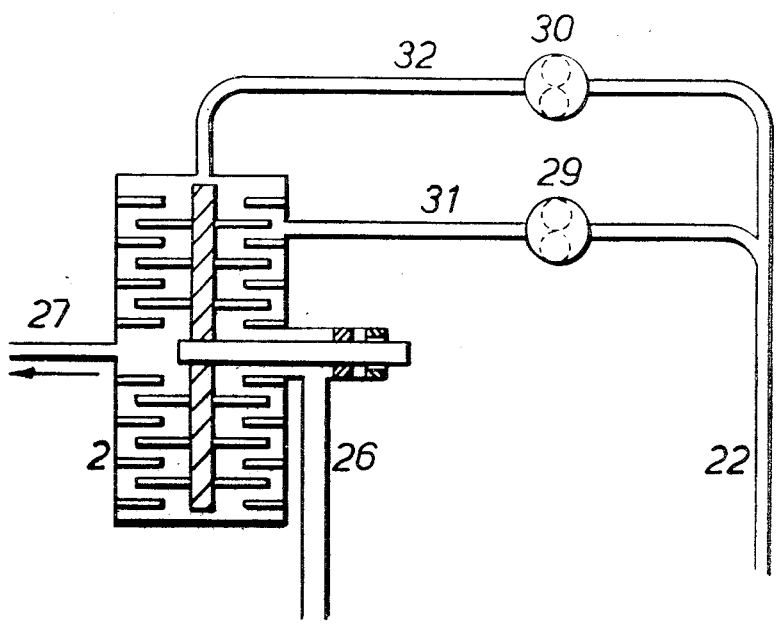

Introduction through two pipes permits better distribution of the reagents in the reactor. This type of introduction is illustrated in FIG. 6 of the accompanying drawings.

The reactors 1 and 2 of the mixer type are conventional; they must be so selected as to be able to work at speeds of rotation higher than 300 revolutions per minute.

In general, the speed of the first reactor is higher than that of the second.

The initial reaction in the first reactor requires a very great dispersion of the various reagents so as to avoid gel formation. The reaction in the second reactor brings about a considerable increase of the viscosity of the mixture and consequently does not permit excessively violent agitation, which would have the disadvantage of effecting excessive heating of the mixture.

Figure 3:
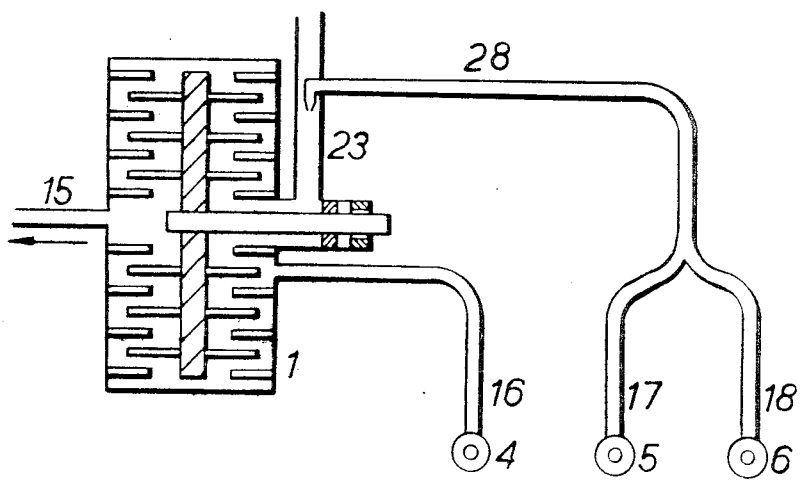
FIG. 3, 4, 5 and 6 show apparatus for different procedures for introduction of the various reactants into reactors employed in the process of the invention.
Figure 4:
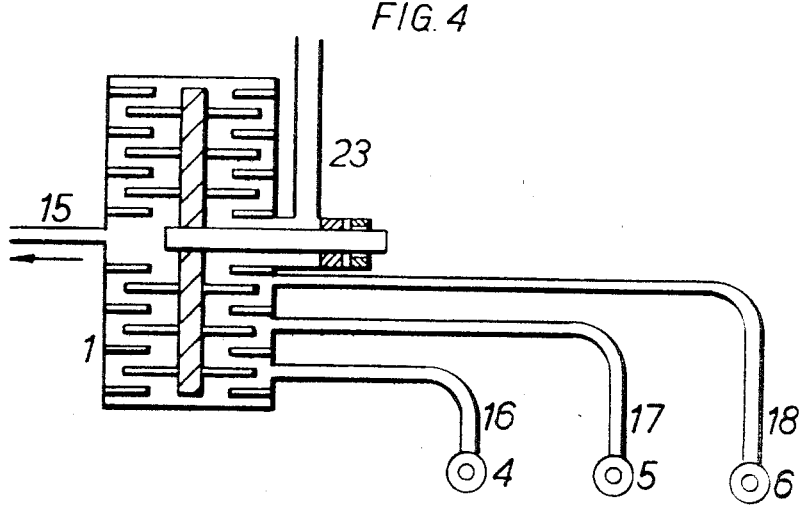
Figure 5:
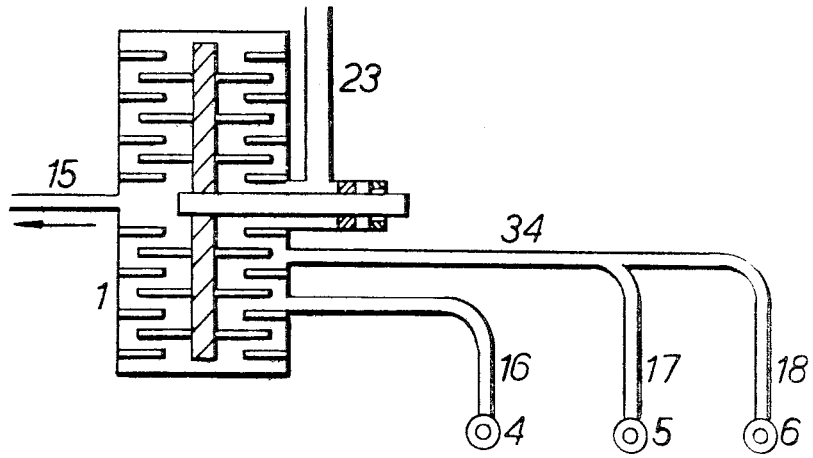

FIGS. 3, 4 and 5 of the accompanying drawings illustrate various forms of introduction of the various reagents into the reactor 1.

In the apparatus shown in FIG. 3, pumps 5 and 6, respectively, deliver the solvent and the chain extension agent into pipes 17 and 18 and those two agents are brought together in pipe 28 which leads into recycling pipe 23.

In the apparatus shown in FIG. 4, pumps 5 and 6, respectively, deliver the solvent and the chain extension agent into the pipes 17 and 18, each of which leads into the reactor 1 at different points.

FIG. 5 illustrates another form of introduction of the solvent and chain extension agent. Pumps 5 and 6 deliver these two reagents to the pipes 17 and 18 and thence to a single pipe 34, which leads into the reactor 1.

In the apparatus shown in FIG. 6, the reactor 2 is fed with dilute prepolymer by pipe 22 and thence by pumps 29 and 30 and corresponding pipes 31 and 32.

Different methods of introducing optionally dilute prepolymer, solvent, chain terminating agent, chain extension agent and recycled semi-polymer may be contemplated.

The method of introduction of the reagents should be selected in such a manner as to promote their dispersion and avoid too direct contact between the prepolymer and the chain extension agent when they are introduced into the reactor.

FIG. 7 illustrates a single reactor carrying out the various reaction phases of the process according to the present invention.

The reactor 35 of conventional mixer type comprises agitation devices of a known type. If a higher degree of agitation is desired in the first reaction zone than in the second, agitation devices 36 and 37 will be different from agitation devices 38 and 39.

In FIG. 7, there are illustrated mobile and fixed agitation blades 37 and 36, of a more powerful type than blades 39 and 38. All possible forms may be used, depending upon the degree of agitation which is desired in the two reaction zones.

As a rule, a higher degree of agitation will be desired in the first reaction zone in order to promote dispersion and a lower degree of agitation in the second reaction zone because, in the latter zone, the viscosity of the medium is substantially higher.

The reactor 35 is fed with dilute prepolymer from a mixer 3 which is supplied at 20 with undiluted prepolymer and at 19 with solvent supplied by pump 7. The mixer 3 is of conventional type provided with agitation devices 13 and 14. The dilute prepolymer coming from mixer 3 passes into pipe 33 and thence through pipes 21 and 22 to corresponding pumps 8 and 10. Pump 8 delivers the prepolymer through pipe 42 into the first reaction zone of reactor 35 and pump 10 delivers the prepolymer through pipe 40 into the second reaction zone.

The chain terminating agent coming from a reservoir (not illustrated) is delivered by pump 4 into pipe 16 leading into pipe 23.

The organic solvent coming from a reservoir (not illustrated) is delivered by pump 5 into pipe 17 leading into recycling pipe 23 and thence to reactor 35.

The chain extension agent is delivered by pump 6 into pipe 18 and injected into urethane semi-polymer recycling pipe 23.

As in the case of the apparatus provided with two separate reactors, it is possible to provide different forms of construction for the introduction of the various reagents.

A certain quantity of semi-polymer leaving reactor 35 through pipe 15, at a point situated at the end of the first reaction zone, is recycled by pump 9 into pipe 23 which leads to the beginning of the first reaction zone. The recycling pipe 23 receives the various reagents as herein described.

The second reaction zone of reactor 35 receives an additional quantity of dilute prepolymer coming from the mixer 3 referred to previously. The dilute prepolymer is supplied through pipes 33 and 22 to pump 10, which delivers it into the reactor 35 through the pipe 40. The dissolved urethane polymer leaves the reactor through pipe 41.

The following example is given for the purpose of illustrating the present invention:

EXAMPLE

Apparatus

The continuous process for polymerization and production of a substantially linear polyurethane in the form of a solution has been carried out with the aid of the following apparatus:

The first reactor comprises a mixer (Oakes Model 4 MBH) with conditioned mechanical packing, permitting utilization at a speed of up to 3000 revolutions per minute.

In the example described below, the speed of rotation of this mixer was higher than 700 revolutions per minute and selected at 1000 revolutions per minute.

The second reactor comprises a mixer of the same type but with "Teflon" packing permitting speeds which may be as high as 500 revolutions per minute, which is the speed selected. The lower speed of rotation of this second reactor, as compared with the first, is explained by the fact that the residual amount of prepolymer to be added is small.

Prepolymerization

Into a three-litre round-bottomed flask there are weighed 900 grams of poly (neopentyl adipate)-glycol having hydroxyl terminal groups and an average molecular weight of 2000, and 300 grams of polypropylene glycol having an average molecular weight of 2000.

The flask is placed in a heating jacket provided with heating control means.

The flask is provided with a stopper containing 4 apertures, intended for a stainless agitator, a thermometer, a dry nitrogen inlet and a connection intended for the introduction of other reagents.

The mixture is brought to a temperature of 60° C. and homogenized with agitation at 200 revolutions per minute. 300 grams of methylene-bis-(4-phenylisocyanate) are then introduced all at once and the agitation rate is reduced to 100 revolutions per minute. When the mixture is homogeneous, the temperature is progressively raised to 80° C. in the course of about 30 minutes.

Heating is then terminated. The temperature rises to 100° C. because of the exothermal reaction. This temperature (98–100° C.) is maintained for 1.5 hours by control of the heating.

After this reaction time, a sample taken for the determination of the isocyanate end groups shows a concentration of isocyanate groups of $80 \times 10^{-5}$ equivalents/gram.

The flask is removed from the heating jacket and cooled, while agitating in an atmosphere of nitrogen on a water bath, to a temperature of 60° C.

The prepolymer thus obtained is diluted with 20% of dimethyl formamide, using a Slack and Parr mixer (Model SP/Mi/II of stainless steel) driven by a motor-reduction gear unit at a speed of 135 revolutions per minute.

Polymerization

Test No. 1.—The prepolymer solution is introduced into the first reactor at a rate of 39 grams per minute and into the second reactor at a rate of 5.6 grams per minute.

Simultaneously, there are introduced into the first reactor, at ambient temperature, 130 grams per minute, of dimethyl formamide, 3.3 grams per minute of a solution of 17 grams per liter of diethanolamine in dimethyl formamide, and 875 mg. per minute of methyl dipropylene-tri-amine and ethylene-diamine in the molar ratio of 1–9.

The outgoing mixture is reintroduced into the first reactor at a rate of 1.750 liters per minute, which represents a flow 10 times as great as the total feed flow of reagents, while the excess mixture feeds the second reactor, from which the final solution containing 20.5% solids leaves at a rate of 178.8 grams per minute.

Under the working conditions described above, there is obtained, in the first reaction stage, a degree of reaction of the chain extension agents of 87.44% and the semi-polymer solution has a viscosity of 12 poises at 22° C.

The polymer solution leaving the second reactor has a viscosity of 187 poises at 22° C.

Test No. 2.—When, in the course of the first reaction phase, the flow of the prepolymer solution is reduced from 39 grams per minute to 36 grams per minute, the degree of reaction drops to 80.7% and the viscosity, measured at 22° C., is then only 4 poises. This result clearly illustrates the influence of the degree of reaction of the chain extension agents on the viscosity of the solution in the first stage.

Test No. 3.— When, under the same conditions of operation as those described above, the recycling to the first reactor is eliminated, a semi-polymer solution is obtained which has a viscosity of 27 poises at 22° C. instead of 12 poises in the first stage, and of 545 poises instead of 185 poises in the second stage. This clearly shows the influence of recycling on viscosity.

All the polymer solutions obtained were spun into an aqueous bath of dimethyl formamide in the usual manner. The results obtained are set out in the following table:

| Test Number | Recycling | Spinning Ten., g./tex. | Spinning Elongation percent |
|---|---|---|---|
| 1 | Yes | 8.66 | 759 |
| 2 | Yes | 8.28 | 679 |
| 3 | No | 7.46 | 664 |

These tests show that the tenacity is not modified when working with a degree of reaction of 80.7 and 87.44%.

On the other hand, elimination of recycling entails a considerable drop of this characteristic.

What is claimed is:

1. A continuous polymerization process for producing a solution of a substantially linear polyurethane, comprising continuously passing into a first reaction zone an organic solvent, a substantially linear isocyanate-terminated prepolymer and at least one chain extension agent having at least two active hydrogen atoms to produce a solution of a semi-polymer, said prepolymer being present in less than a stoichiometric amount so that there is obtained in the first reaction zone a degree of reaction in excess of about 80% but less than 100%, and passing continuously into a second reaction zone said semi-polymer solution and an amount of a substantially linear isocyanate-terminated prepolymer necessary for completion of the polymerization of the semi-polymer.

2. The process of claim 1 in which a portion of the semi-polymer solution is recycled to the first reaction zone.

3. The process of claim 2 in which the quantity of semi-polymer solution recycled is such that the rate of reaction in the first reaction zone is substantially reduced.

4. The process of claim 3 in which the chain extension agents is a lower aliphatic diamine.

5. The process of claim 4 in which the lower aliphatic diamine is ethylenediamine, tetramethylenediamine, hydrazine or a derivative of any of them.

6. The process of claim 2 in which the flow of the semi-polymer solution recycled into the first reaction zone is greater than twice that of the prepolymer and chain extension agent.

7. The process of claim 1 in which the degree of reaction in the first reaction zone is at least 85%.

8. The process of claim 1 in which there is also passed into the first reaction zone a chain terminating agent.

9. The process of claim 1 in which the solvent is dimethylformamide, dimethylacetamide or dimethylsulfoxide.

10. The process of claim 1 in which the chain extension agent is dissolved in a solvent.

11. The process of claim 1 in which the prepolymer is dissolved in a solvent.

12. The process of claim 11 in which the dilution of the urethane prepolymer solution has a solid content of 15 to 20%.

13. The process of claim 1 in which the substantially linear polyurethane solution has a solids content of 10 to 25%.

14. The process of claim 1 in which at least two chain extension agents are employed.

15. The process of claim 14 in which at least one of the chain extension agents effectuates an increase in the dyeing affinity of the urethane polymer produced.

References Cited

UNITED STATES PATENTS 3,070,427  12/1962  Harris et al. _____ 260—77.5 X
3,346,529  10/1967  Peters.

DONALD E. CZAJA, Primary Examiner

M. J. WELSH, Assistant Examiner

U.S. Cl. X.R.

23—285; 260—32.6 N, 75 NE, 77.5 AA